Dec. 7, 1954
C. GERST
2,696,372
CONCRETE MIXER DRUM
Filed Feb. 28, 1952
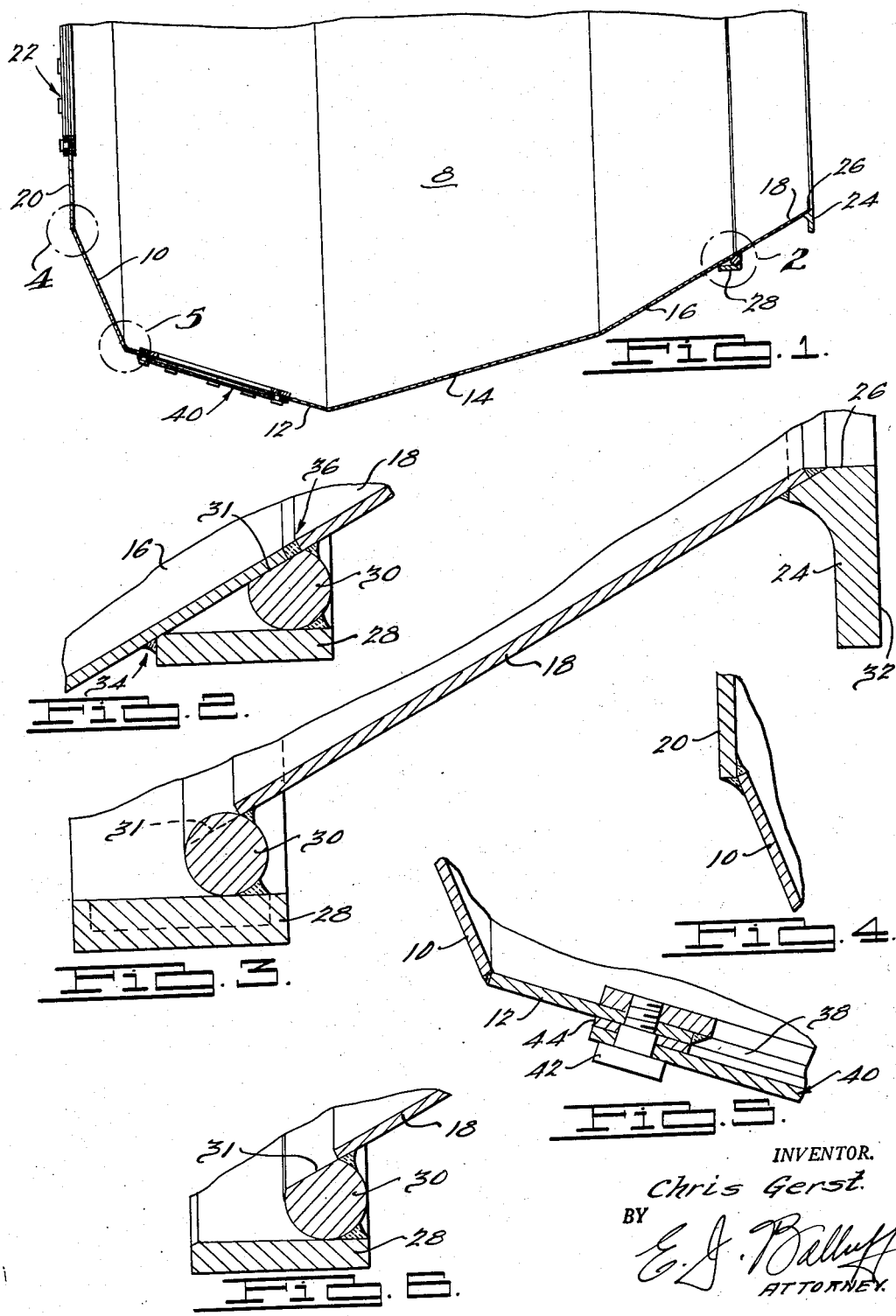
INVENTOR.
Chris Gerst.
BY
E. J. Balluff
ATTORNEY.

2,696,372

CONCRETE MIXER DRUM

Chris Gerst, Detroit, Mich., assignor, by mesne assignments, to Le Roi Company, Milwaukee, Wis., a corporation of Delaware Application February 28, 1952, Serial No. 273,833

5 Claims. (Cl. 259—175)

This invention relates to concrete mixers in general and has particular reference to a new and improved mixing drum adapted for use in a concrete mixer of the transit type, and to a method of manufacturing the same.

Transit mixers are ordinarily provided with a drum supported at its inner or closed end for rotation about its axis and a track member encircling the drum adjacent the other or open end thereof which is adapted to ride on supporting rollers which rotatably support the open end of the drum for rotation about its axis. In manufacturing such mixing drums, it has been the practice to completely form the drum by securing together sheet metal sections and to thereafter secure a cylindrical track member to the drum adjacent the open end thereof by welding the track member to the drum. There are disadvantages inherent in such a construction since the heat absorbed by the drum during welding of the track member to the drum in many cases causes some distortion of the drum with the result that it was heretofore found necessary to machine the outer cylindrical surface of the track member after the same had been welded to the drum in order to provide a surface concentric with the axis of the drum. This distortion sometimes distorts the drum to such an extent that it has also been necessary at times to machine the outer radial face of the annular drip ring which is secured to the outer open end of the drum and defines a closure seat around the opening through which material is charged into and discharged from the drum. The outer radial surface of the drip ring must be flat and substantially perpendicular to the axis of the drum in order that the closure with which the mixer is provided may seat against the ring and properly seal the opening in the drum. The necessity of machining the track member and the drip ring after assembly thereof to the drum unnecessarily complicates the manufacture of the drum since such practice requires the use of relatively large and bulky fixtures and other equipment which adds considerably to the expense of manufacture.

The present invention pertains to a mixing drum constructed in such a manner as to obviate many of the difficulties heretofore encountered in the manufacture of drums of this type. More particularly, the invention pertains to drum construction in which the cylindrical track member and the annular drip ring are secured to a neck portion or section of the drum and then machined to their proper dimensions, the end portion of the drum and the track member being secured to the remainder of the drum to complete the same after such machining operations have been completed.

A principal object of the invention, therefore, is to provide a new and improved drum construction for a concrete mixer.

A further object of the invention is to provide a new and improved method of constructing a mixing drum for a concrete mixer.

Another object of the invention is to provide a new and improved mixing drum for a concrete mixer which is considerably easier and less expensive to manufacture than has heretofore been possible.

Another object of the invention is to provide a mixing drum so constructed and arranged that machining operations, after the assembly of the drum, are eliminated.

Other and further objects of the invention will be apparent from the following description and claims and may be understood by reference to the accompanying drawings, of which there is one sheet, which by way of illustration show the preferred embodiment of the invention and what I now consider to be the best mode in which I have contemplated applying the principles of my invention. Other embodiments of the invention may be used without departing from the scope of the present invention as set forth in the appended claims.

In the drawings:

Fig. 1 is a fragmentary sectional view of a mixer drum embodying my invention;

Fig. 2 is an enlarged fragmentary sectional view of the structure enclosed within the circle numbered 2 in Fig. 1;

Fig. 3 is an enlarged fragmentary sectional view of one section of the mixer drum during one stage of its manufacture;

Fig. 4 is an enlarged fragmentary sectional view of the structure enclosed within the circle 4 of Fig. 1;

Fig. 5 is an enlarged fragmentary sectional view of the structure enclosed within the circle 5 of Fig. 1; and Fig. 6 is a fragmentary sectional view of a portion of the drum section shown in Fig. 3 after machining thereof and before assembly of such section to the remainder of the drum.

Referring more particularly to the drawings, a mixing drum 8 embodying my invention may comprise in general a plurality of sheet metal sections 10, 12, 14, 16 and 18 and an inner end wall section 20 secured together, such as by welding, to form a hollow symmetrical drum closed at its inner end and open at its other end. The end wall 20 may be provided with a suitable mounting structure indicated at 22 adapted to support the closed end of the drum for rotation about its axis and to be connected to a driving mechanism (not shown) for rotating the drum about its axis in either direction.

An annular drip ring 24 is secured to the outer end of the section 18 and defines the opening 26 in the end of the drum through which material may be charged into and discharged from the drum. An annular rotatable closure (not shown) may be suitably supported for movement toward and away from the opening in the drum and adapted to seat against the drip ring 24 for sealing the opening in the drum.

A cylindrical track member 28 is secured to the outer surface of the drum adjacent the outer end thereof and is adapted to ride on suitable roller means provided on the mixer for rotatably supporting the open end of the drum.

This invention is particularly concerned with a drum of the type described above so constructed as to facilitate assembly of the sections of the drum and to eliminate the necessity of machining certain surfaces on the drip ring 24 and the track member 28 after assembly of the drum is completed. To this end it is proposed to form the sheet metal sections 10, 12, 14 and 16 and to secure the same and the end wall section 20 together by welding the joints thereof as shown in Figs. 1, 4 and 5. Thereafter the outer end section 18 may be formed and the drip ring 24 secured to the outer end thereof and an annular spacing member 30 made of bar stock or the like may be arranged around and secured to the other end of frusto-conical section 18. The parts 24 and 30 are secured to the section 18 by welding. A cylindrical track member 28 is then secured to the spacing member 30 by welding to complete the assembly as partially shown in Fig. 3.

After assembly of drip ring 24 and track member 28 to the section 18 the outer radial surface 32 is machined until the same is substantially flat and perpendicular to the axis of the section 18. If necessary, the inner cylindrical surface of the ring 24 which defines the opening 26 in the end of the drum may also be machined at this time.

In Fig. 3 the parts 28 and 30 are shown before machining thereof after their assembly to the end section 18. The parts may be machined substantially to the dotted lines shown thereon in Fig. 3 from which it will be seen that the spacing member 30 is machined until the inner surface 31 thereof is substantially in line with and forms a continuation of the outer frusto-conical surface of section 18. The outer cylindrical surface of track 28 is machined until the same is concentric with the axis of section 18 and has a predetermined diameter and a length which will enable the end section 18 to be assembled to section 16 with the parts arranged in the proper relation as shown in Fig. 2. After end section 18 has been completely machined it is assembled onto the end of drum section 16. As shown in Fig. 2, the section 18 forms a continuation of the surface formed by the adjacent section 16 and the abutting ends of sections 18 and 16 are spaced slightly apart thereby permitting proper axial alignment and adjustment of sections 16 and 18, while the outer end of section 16 seats against the beveled surface 31 formed on spacing member 30. The inner end of track 28 seats against the outer surface of section 16 and may be welded thereto as indicated at 34. The space between the abutting ends of sections 16 and 18 may at this time be filled with welding material and thereafter welded as indicated at 36 so as to secure the same together and to spacing member 30.

When the spacing member 30 is welded to section 18, and the track member 28 is welded to spacing member 30, certain distortions of such parts may take place because of the heat from the welding operations. In the present construction the effects of such distortion are unimportant since the parts are subsequently machined to the desired dimensions and it is relatively easy to handle the section 18 while machining drip ring 24 and track 28. The weld indicated at 34 may be a series of spot welds and the weld joint between sections 16 and 18 is too far removed from the joint between spacing member 30 and track 28 to cause the heat of such welding operations to create any distortion of track 28 which would necessitate further machining of the track.

It will be seen that by the use of the present construction the manufacture and assembling of the drum will be greatly facilitated since it is unnecessary to perform any machining operations on the parts 24 and 28 after their assembly thereof to the drum.

The various sections which comprise the drum and the end wall 20 may be secured together by continuous seam welds. The section 12 may be provided with an opening 38 therein to provide an opening from the drum. A hatch cover 40 may be detachably secured to section 12 by bolts 42 and a gasket 44 is arranged between the section 12 and cover 40. The drum is customarily arranged for rotation on a rearwardly, upwardly inclined axis so that the opening in section 12 will be arranged generally horizontally when the drum is rotated into one position thereof.

While I have illustrated and described a preferred embodiment of my invention, it is understood that this is capable of modification and I therefore do not wish to be limited to the precise details set forth, but desire to avail myself of such changes and alterations as fall within the purview of the following claims.

I claim:

1. The method of making a drum for use in a concrete mixer and which drum is adapted to be supported for rotation about its axis, comprising, forming and securing together a plurality of sheet metal sections to form a hollow, symmetrical drum open at its outer end, forming a frusto-conical outer end section for said drum, securing an annular ring to the smaller diameter end of said outer end section, securing an annular spacing member to the outer surface of the larger diameter end of said outer end section, securing a cylindrical track member to said spacing member, machining the outer radial surface of said ring until the same is substantially perpendicular to the axis of said outer end section, machining the outer cylindrical surface of said track member concentric with said axis, machining a beveled inner surface on said spacing member adjacent to the larger diameter end of said outer end section arranging said outer end section in line with the axis of said drum with said track member encircling the outer end of the adjacent section of said drum and with said outer end section seated against said beveled surface and slightly spaced from said adjacent section, and then securing said track member to said adjacent drum section and said adjacent section to said spacing member and to said outer end section.

2. The method of making a drum for use in a concrete mixer and which drum is adapted to be supported for rotation about its axis, comprising, forming and securing together a plurality of sheet metal sections to form a hollow, symmetrical drum open at its outer end, forming a frusto-conical outer end section for said drum, securing an annular spacing member to the outer surface of the larger diameter end of said outer end section, securing a cylindrical track member to said spacing member, machining the outer cylindrical surface of said track member concentric with the axis of said outer end section, machining a beveled inner surface on said spacing member forming a continuation of the outer surface of said outer end section, assembling said outer end section onto said drum in line with the axis thereof with said track member abutting the exterior surface of the adjacent section of said drum and with the outer end of said adjacent drum section seated against said beveled surface on said spacing member and slightly spaced from said outer end section, and then securing said track member to said adjacent drum section and said adjacent section to said spacing member and to said outer end section.

3. In a concrete mixer of the rotatable mixer drum type, a mixer drum construction comprising, a plurality of sheet metal sections and an end wall section secured together to form a symmetrical hollow drum section open at one end thereof and an end section secured to said one end of said drum section to complete the drum, said end section comprising a frusto-conical sheet metal section having its larger diameter end aligned with said open end of said drum section, an annular drip ring secured to the smaller diameter end of said end section, an annular spacing member welded to the outer surface of said larger diameter end of said end section and having an annular inner surface overlapping the adjacent end of said drum section, the outer surface of said adjacent end of said drum section being seated on said annular surface of said spacing member, the opposing end surfaces of said drum and end sections being welded together and to said surface of said spacing member, and a cylindrical track member surrounding said spacing member and welded thereto, said track member being welded to the outer surface of said drum section.

4. The method of making a drum for use in a concrete mixer and which drum is adapted to be supported for rotation about its axis, comprising, forming and securing together a plurality of sheet metal sections to form a hollow drum having an open end section, forming an additional section for said drum, securing an annular spacing member to the outer surface of one end of said additional section, securing a cylindrical track member to said spacing member, machining the outer cylindrical surface of said track member, machining an inner surface on said spacing member conforming to the outer surface of said open end drum section, assembling said additional section onto said open end drum section in line with the axis thereof with said track member encircling the exterior surface of said end drum section and with the outer end of said end drum section seated against said inner machined surface on said spacing member, and then securing said end drum section to said spacing member.

5. In a concrete mixer of the rotatable mixer drum type, a mixer drum construction comprising, a plurality of sheet metal sections secured together to form a hollow drum section open at one end thereof and an end section secured to said one end of said drum section to complete the drum, said end section comprising a sheet metal section having one end alined with said open end of said drum section, an annular spacing member welded to the outer surface of said one alined end of said end section and having an annular inner surface overlapping the adjacent end of said drum section, the outer surface of said adjacent end of said drum section being seated on said annular surface of said spacing member, the opposing end surfaces of said drum and end sections being welded together and to said surface of said spacing member, and a cylindrical track member surrounding said spacing member and welded thereto.

References Cited in the file of this patent

UNITED STATES PATENTS

| Number | Name | Date |
| --- | --- | --- |
| 1,748,577 | Merriam | Feb. 25, 1930 |
| 1,853,556 | Fairweather | Apr. 12, 1932 |
| 1,933,772 | Stresau | Nov. 7, 1933 |
| 1,946,494 | Horton | Feb. 13, 1934 |
| 2,041,699 | Dahlstrand | May 26, 1936 |
| 2,216,033 | Hopkins | Sept. 24, 1940 |
| 2,226,496 | Jacocks | Dec. 24, 1940 |
| 2,338,820 | Peters | Jan. 11, 1944 |
| 2,490,215 | Hilkemeier et al. | Dec. 6, 1949 |